(12) United States Patent
Rapaka et al.

(10) Patent No.: US 9,338,452 B2
(45) Date of Patent: May 10, 2016

(54) MOTION VECTOR DIFFERENCE CODING EXTENSION FOR ENHANCEMENT LAYER

(71) Applicant: QUALCOMM Incorporated, San Diego, CA (US)

(72) Inventors: Krishnakanth Rapaka, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 13/934,542

(22) Filed: Jul. 3, 2013

(65) Prior Publication Data

US 2014/0010310 A1    Jan. 9, 2014

Related U.S. Application Data

(60) Provisional application No. 61/669,336, filed on Jul. 9, 2012, provisional application No. 61/706,467, filed on Sep. 27, 2012.

(51) Int. Cl.
*H04N 19/523* (2014.01)
*H04N 19/52* (2014.01)
*H04N 19/51* (2014.01)
*H04N 19/30* (2014.01)
*H04N 19/59* (2014.01)

(52) U.S. Cl.
CPC ......... *H04N 19/00587* (2013.01); *H04N 19/30* (2014.11); *H04N 19/51* (2014.11); *H04N 19/52* (2014.11); *H04N 19/523* (2014.11); *H04N 19/59* (2014.11)

(58) Field of Classification Search
CPC ....... H04N 19/30; H04N 19/51; H04N 19/52; H04N 19/523; H04N 19/59
USPC ..................................................... 375/240.17
See application file for complete search history.

(56) References Cited

U.S. PATENT DOCUMENTS

| | | | |
|---|---|---|---|
| 7,916,952 B2 | 3/2011 | Demos | |
| 2005/0220190 A1* | 10/2005 | Ha ......................... | H04N 19/53 375/240.16 |
| 2006/0012719 A1* | 1/2006 | Karczewicz ......... | H04N 19/187 348/699 |
| 2006/0023066 A1 | 2/2006 | Li et al. | |

(Continued)

OTHER PUBLICATIONS

Boyce et al., "Information for HEVC scalability extension," (2011), pp. 1-7.*

(Continued)

*Primary Examiner* — Christopher S Kelley
*Assistant Examiner* — Kathleen Walsh
(74) *Attorney, Agent, or Firm* — Knobbe, Martens, Olson & Bear, LLP

(57) ABSTRACT

An apparatus for coding video information according to certain aspects includes a memory unit and a processor in communication with the memory unit. The memory unit stores difference video information associated with a difference video layer of pixel information derived from a difference between an enhancement layer and a corresponding base layer of the video information. The processor determines pixel accuracy of motion predictor information, determines a motion vector based on the pixel accuracy of the motion predictor information, and determines a value of a video unit based at least in part on the motion vector.

43 Claims, 6 Drawing Sheets

(56) References Cited

U.S. PATENT DOCUMENTS

| | | | |
|---|---|---|---|
| 2006/0023782 A1* | 2/2006 | Cai | H04N 19/597 375/240.03 |
| 2006/0193388 A1* | 8/2006 | Woods | H04N 19/647 375/240.16 |
| 2007/0025442 A1 | 2/2007 | Okada et al. | |
| 2011/0200108 A1* | 8/2011 | Joshi | H04N 19/513 375/240.16 |
| 2012/0183056 A1* | 7/2012 | He | H04N 19/33 375/240.12 |
| 2014/0003505 A1* | 1/2014 | Lainema et al. | 375/240.12 |

OTHER PUBLICATIONS

Mayer et al., "Bit Plane Quantization for Scalable Video Coding," (2002), SPIE, pp. 1142-1152.*

Jung et al., "Adaptive quarter-pel motion estimation and motion vector coding algorithm for the H.264/AVC standard," (2009), SPIE, pp. 110502-1-110502-3.*

ISO/IEC 14496-2:2004 Technical Corrigendum 1, Published Jun. 15, 2004, Information technology—Coding of audio-visual objects—Part 2: Visual ISO/IEC 14496-2, 3rd Edition Jun. 1, 2004, Ref. No. ISO/IEC 14496-2:2004/Cor.1:2004(E), pp. 1-28.

Boyce J. et al., "Information for HEVC scalability extension", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T Sg.16); URL: http://wftp3.itu.int/av-arch/jctvc-site/ No. JCTVC-G078, Nov. 8, 2011, XP030110062, pp. 1-7.

International Search Report and Written Opinion—PCT/US2013/049456—ISA/EPO—Nov. 5, 2013.

Jung S-W. et al., "Adaptive quarter-pel motion estimation and motion vector coding algorithm for the H.264/AVC standard,"Opt. Eng. 48(11), 110502-1-3 (Nov. 4, 2009); doi: 10.1117/1.3257262.

Mayer C. et al., "Bit plane quantization for scalable video coding", Visual Communications and Image Processing; Jan. 21, 2002-Jan. 23, 2002; San Jose, Jan. 21, 2002, XP030080610; vol. 4671; pp. 1142-1152.

Park S-H. et al., "Improved Motion Vector Prediction Method in Scalable Video Coding", Proceedings of Intelligent Signal Processing and Communication Systems (ISPACS), International Symposium on Hong Kong Dec. 13-16, 2005, Piscataway, NJ, USA, IEEE, Dec. 13, 2005, pp. 253-256, XP010894584, ISBN: 978-0-7803-9266-3.

Van Der Schaar M. et al., "Adaptive Motion-Compensation Fine-Granular-Scalability (AMC-FGS) for Wireless Video", IEEE Transactions on Circuits and Systems for Video Technology, IEEE Service Center, Piscataway, NJ, US, Jun. 1, 2002, vol. 12, No. 6, pp. 360-371, XP001114968, ISSN: 1051-8215, DOI: 10.1109/TCSVT.2002. 800319.

Tan T. K. et al., "A Frequency Scalable Coding Scheme Employing Pyramid and Subband Techniques", IEEE Transactions on Circuits and Systems for Video Technology, IEEE Service Center, Piscataway, NJ, US, Apr. 1, 1994, vol. 4, No. 2, pp. 203-207, XP000489693, ISSN: 1051-8215, DOI: 10.1109/76.285629.

* cited by examiner

MOTION VECTOR DIFFERENCE CODING EXTENSION FOR ENHANCEMENT LAYER

RELATED APPLICATION

This application claims the benefit of U.S. Provisional Application No. 61/669,336, filed Jul. 9, 2012, and U.S. Provisional Application No. 61/706,467, filed Sep. 27, 2012, the entire contents of which are incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to scalable video coding (SVC). More specifically, the techniques of this disclosure relate to inter prediction in difference domain coding. In some examples, the techniques may consider motion vector predictor information, such as the pixel accuracy of the reference motion vectors, in coding the motion vector delta for the current video unit in the difference domain. For example, a predictor motion vector with similar pixel accuracy may be given more weight in calculating the value of the current video unit. Similarly, a predictor motion vector from the same domain, e.g., difference domain, may be given more weight. In some embodiments, the order of the syntax for motion vector delta coding may be changed in order to provide the motion vector predictor information prior to providing the motion vector delta information. Accordingly, the motion vector predictor information may be used to code the motion vector delta more efficiently. Moreover, the motion vector predictor information may be used to provide additional context information for the motion vector delta in entropy coding.

An apparatus for coding video information according to certain aspects includes a memory unit and a processor in communication with the memory unit. The memory unit stores difference video information associated with a difference video layer of pixel information derived from a difference between an enhancement layer and a corresponding base layer of the video information. The processor determines pixel accuracy of motion predictor information, determines a motion vector based on the pixel accuracy of the motion predictor information, and determines a value of a video unit based at least in part on the motion vector.

The details of one or more examples are set forth in the accompanying drawings and the description below. Other features, objects, and advantages will be apparent from the description and drawings, and from the claims.

DETAILED DESCRIPTION

Figure 1:
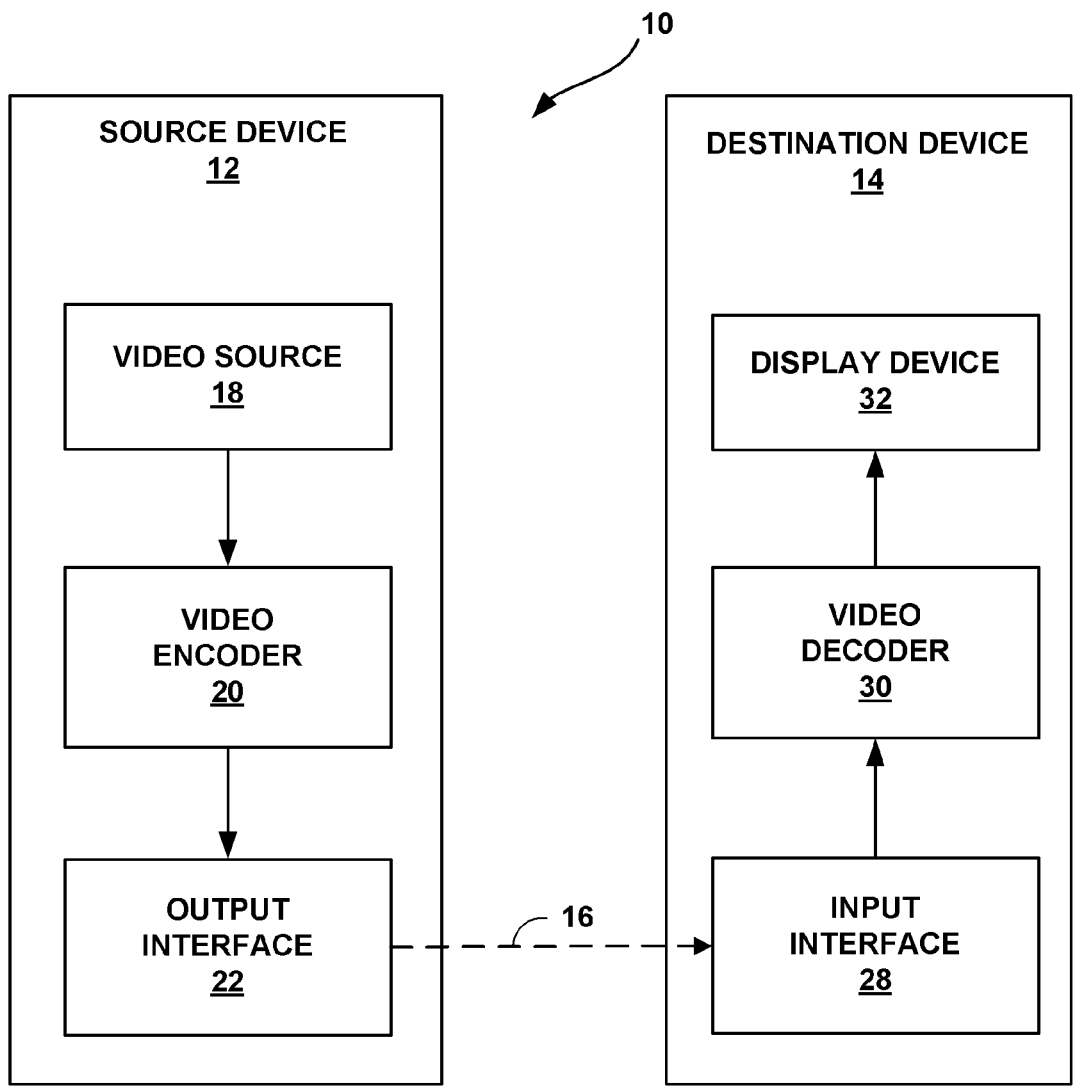
FIG. 1 is a block diagram illustrating an example video encoding and decoding system that may utilize techniques in accordance with aspects described in this disclosure.

The techniques described in this disclosure generally relate to scalable video coding (SVC). For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3. zip, as of Jun. 7, 2012. The full citation for the HEVC Working Draft 7 is document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scaling, spatial scaling and/or temporal scaling. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In coding an enhancement layer, inter prediction may be performed using either pixel domain or difference domain. Inter prediction is prediction based on temporal correlation between video blocks in two frames or slices in sequence of time. For example, the value of a current video block being coded may be predicted using a motion vector that indicates a displacement from the reference video block in a previously coded frame or slice. In SVC, video information can be coded using a base layer and one or more enhancement layers, and inter prediction can be performed in the difference domain, e.g., by taking the difference between the enhancement layer and the reconstructed base layer. The difference domain may refer to a set of difference pixels formed by subtracting the reconstructed base layer pixels from the original pixels in the enhancement layer, or vice versa. Inter prediction in the difference domain can take advantage of the temporal correlation between frames as well as the correlation between a base layer and an enhancement layer.

In general, motion vector characteristics are different for difference domain prediction and non-difference domain (e.g., pixel domain) prediction. For example, the motion vectors may differ in the difference and non-difference domain in terms of sub-pixel accuracy. The difference domain generally may have a higher probability of half pixel motion vectors, and the non-difference domain generally has a higher probability of quarter pixel motion vectors. Therefore, it may not be efficient to use a predictor motion vector from the non-difference domain in order to code the motion vector delta for a pixel in the difference domain, and vice versa. Accordingly, it would be advantageous to utilize the information regarding the motion vector characteristics in coding the motion vector delta for the current pixel.

The techniques described in this disclosure may address issues relating to inter prediction in the difference domain. The techniques may consider the predictor motion vector characteristics in coding the motion vector delta in the difference domain. Such characteristics may include, for example, whether the predictor motion vectors are from the difference domain or from the non-difference domain, or whether the pixel accuracy of the predictor motion vectors is half pixel, quarter pixel, etc. The information provided in the motion vector predictor information, such as the pixel accuracy of the reference motion vectors, may be used to code the motion vector delta for the current video unit more efficiently. For example, if a predictor motion vector is a quarter pixel, less weight may be given to this predictor motion vector since a motion vector in the difference domain is likely to be a half pixel. On the other hand, if a predictor motion vector is a half pixel, more weight may be given to the prediction motion vector since a motion vector in the difference domain is likely to be a half pixel. Similarly, if a predictor motion vector is from the non-difference domain, it may be given less weight in predicting the value of the current pixel in the difference domain. On the other hand, if the predictor motion vector is from the difference domain, it may be given more weight. In some embodiments, the order of the syntax for motion vector delta coding may be changed in order to provide the motion vector predictor information prior to providing the motion vector delta information.

The techniques described in this disclosure may also use motion vector predictor information to determine additional context information used in entropy coding, e.g., context-adaptive binary arithmetic coding (CABAC). Context information may indicate the probability associated with a value being entropy coded. For example, the context information may indicate the probability of the entropy coded value being 1, or the probability of the entropy coded value being 0, etc. The additional context information may be used for coding the motion vector delta of the current video unit in the difference domain.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
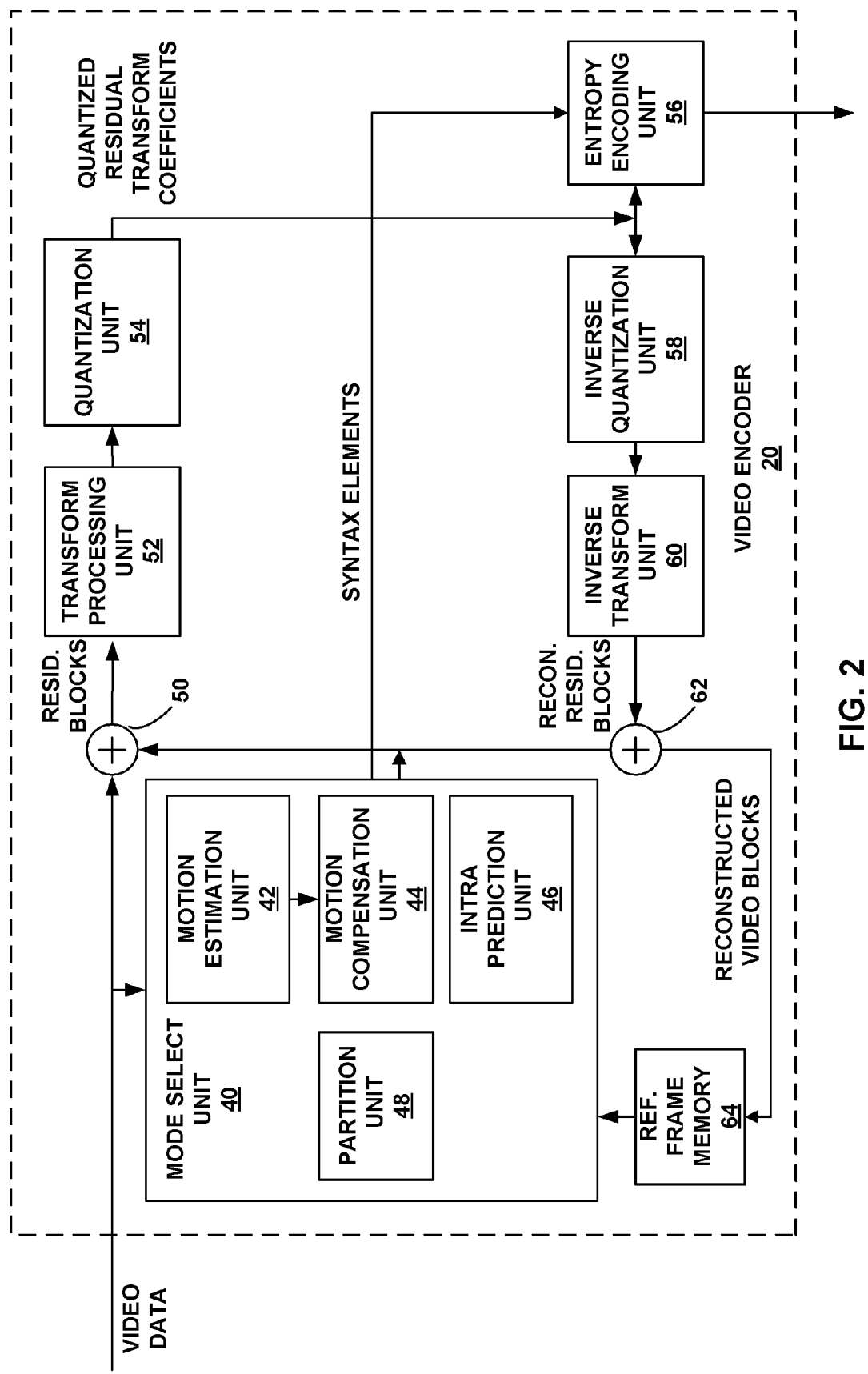
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

In some embodiments, the mode select unit 40, the motion estimation unit 42, the motion compensation unit 44 (or another component of the mode select unit 40, shown or not shown), or another component of the encoder 20 (shown or not shown) may perform the techniques of this disclosure. For example, the mode select unit 40 may receive video data for encoding, which may be encoded into a base layer and corresponding one or more enhancement layers. The mode select unit 40, the motion estimation unit 42, the motion compensation unit 44, or another appropriate unit of the encoder 20 may determine pixel accuracy of motion predictor information. The appropriate unit of the encoder 20 can determine a motion vector based on the pixel accuracy of the motion predictor information, and determine a value of a video unit based at least in part on the motion vector. The encoder 20 can encode the video unit and signal the motion predictor information in a bitstream.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
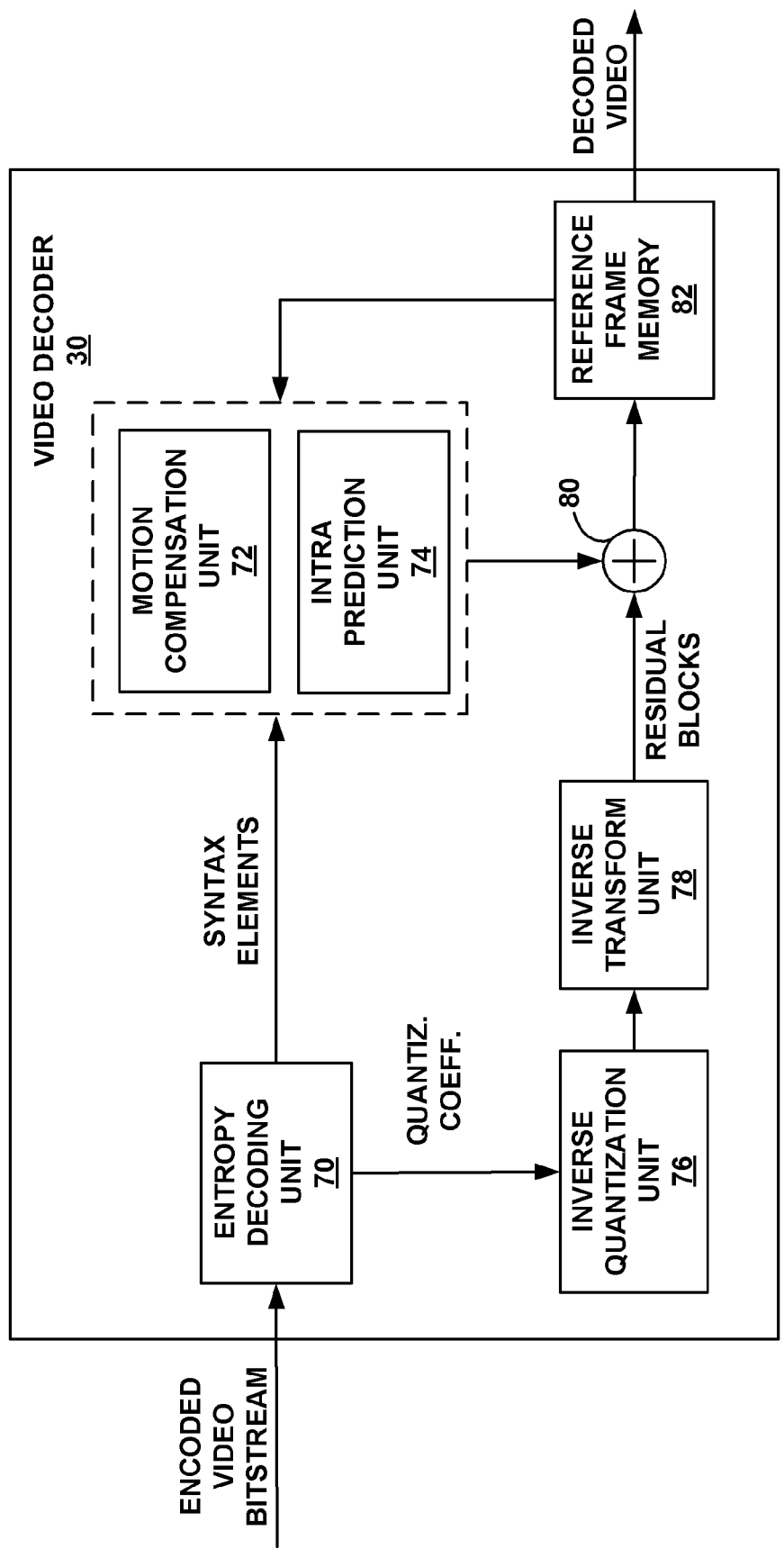
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In some embodiments, the entropy decoding unit 70, the motion compensation unit 72, or another component of the decoder 30 (shown or not shown) may perform the techniques of this disclosure. The motion compensation unit 72 or another appropriate unit of the decoder 30 may determine pixel accuracy of motion predictor information. The appropriate unit of the decoder 30 can determine a motion vector based on the pixel accuracy of the motion predictor information, and determine a value of a video unit based at least in part on the motion vector. The decoder 30 can decode the video unit and receive the motion predictor information in a bitstream.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., dequantizes, the quantized transform coefficients provided in the bitstream and decoded by entropy decoding unit 80. The inverse quantization process may include use of a quantization parameter $QP_y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Figure 4:
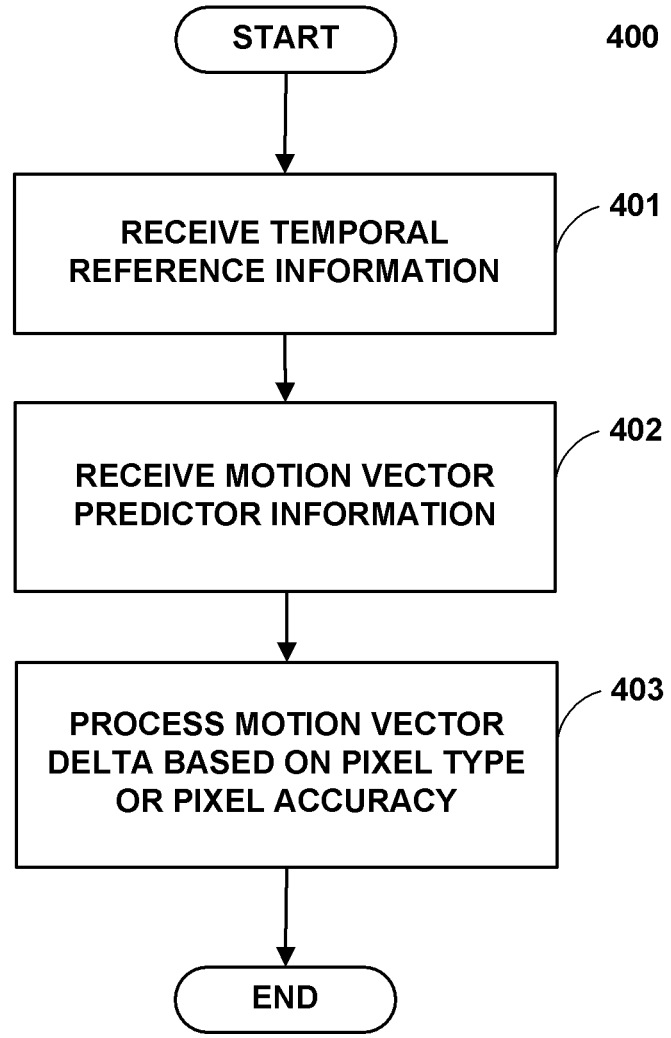
FIG. 4 is a flowchart illustrating an example method for motion vector difference coding for enhancement layer according to aspects of this disclosure.

FIG. 4 is a flowchart illustrating an example method for motion vector difference coding for enhancement layer according to aspects of this disclosure. As explained above, the motion vector characteristics may be different in the difference domain and the non-difference domain (e.g., pixel domain, etc.). For example, the difference domain is more likely to contain half-pixel motion vectors, whereas the non-difference domain is more likely to contain quarter-pixel motion vectors. Accordingly, the motion vectors may have varying sub-pixel level accuracy in inter prediction in the difference and the non-difference domains. Therefore, it would be advantageous to utilize the motion vector predictor information in coding the motion vector delta for the current pixel in the difference domain.

The example method for motion vector difference coding for enhancement layer according to aspects of this disclosure uses the motion vector predictor information in order to code the motion vector delta for the current prediction unit (PU). The motion vector predictor information may include information relating to the motion vectors that are to be used in predicting the value of the current PU. Such information may include the pixel accuracy for the motion vectors. The information provided in the motion vector predictor information may be used in predicting the current PU using the motion vector delta. In inter prediction, video units that have temporal correlation (e.g., frames from two different points in time) may be used to predict the value of the current pixel. The difference between the reference video unit and the current video unit may be indicated by motion vectors. In HEVC, motion vector information is coded using motion vector deltas, which indicate the difference between the motion vector of the reference pixel and the motion vector of the current pixel.

The information provided in the motion vector predictor information, such as the pixel accuracy of the reference motion vectors, may be used to code the motion vector delta for the current video unit more efficiently. For example, if a predictor motion vector is a quarter pixel, less weight may be given to this predictor motion vector since a motion vector in the difference domain is likely to be a half pixel. On the other hand, if a predictor motion vector is a half pixel, more weight may be given to the prediction motion vector since a motion vector in the difference domain is likely to be a half pixel. Similarly, if a predictor motion vector is from the non-difference domain, it may be given less weight in predicting the value of the current pixel in the difference domain. On the other hand, if the predictor motion vector is from the difference domain, it may be given more weight.

In the current implementation of HEVC, the motion vector predictor information is coded after the motion vector delta. Accordingly, the motion vector predictor information is not used in processing the motion vector delta. The example method for motion difference coding according to aspects of this disclosure may change the coding order such that the motion vector predictor information is available prior to coding the motion vector delta. For example, the current syntax for motion vector coding in HEVC is as follows:

Ref_Idx
Mvd_coding
MVP_index

The "Ref_Idx" flag refers to the temporal references. Multiple temporal references may be used. Temporal references are the references at different points in time, from which the motion vectors for calculating the current pixel value will be obtained. The "Mvd_coding" flag refers to motion vector delta, which is the difference between the predictor motion vector and the current (or actual) motion vector. The "MVP_index" refers to motion vector predictor information, which indicates the motion vectors from the pixels that are close to the current pixel. In some embodiments, the coding order of the syntax may be changed as follows:

Ref_Idx
MVP_index
Mvd_coding

By coding the motion vector predictor information prior to coding the motion vector delta information, the predictor information may be available in coding the motion vector. For example, the encoder or decoder may adjust the process of predicting the value of the current pixel in the difference domain depending on the pixel accuracy in the motion vector predictor information. Such adjustment may include increasing, decreasing, multiplying, or dividing the value of the current pixel by a coefficient. Accordingly, the example method for motion vector difference coding may incorporate the characteristics and statistics of motion vectors in the difference domain and the non-difference domain in order to code the motion vector delta for the pixels in the difference domain. In some embodiments, the syntax for motion vector difference coding may be modified as follows:

TABLE 1

Example PU Level Inter Mode Syntax Information
Decoding for Enhancement Layer

```
MODE_INTER */
    merge_flag[x0][y0]
    if (merge_flag[x0][y0]) {
        if (MaxNumMergeCand > 1)
            merge_idx[x0][y0]
    } else {
        if (slice_type = = B)
            inter_pred_flag[x0][y0]
        if (inter_pred_flag[x0][y0] = = Pred_LC) {
            if (num_ref_idx_lc_active_minus1 > 0)
                ref_idx_lc[x0][y0]
            mvp_lc_flag[x0][y0]
            mvd_coding(mvd_lc[x0][y0][0],
                    mvd_lc[x0][y0][1])
        } else { /* Pred_L0 or Pred_Bl */
            if (num_ref_idx_l0_active_minus1 > 0)
                ef_idx_l0[x0][y0]
            mvp_l0_flag[x0][y0]
            mvd_coding(mvd_l0[x0][y0][0],
                    mvd_l0[x0][y0][1])
        }
        if (inter_pred_flag[x0][y0] = = Pred_Bl) {
            if (num_ref_idx_l1_active_minus1 > 0)
                ref_idx_l1[x0][y0]
            if (mvd_l1_zero_flag) {
                mvd_l1[x0][y0][0] = 0
                mvd_l1[x0][y0][1] = 0
            } else
                mvp_l1_flag[x0][y0]
                mvd_coding(mvd_l1[x0][y0][0],
                        mvd_l1[x0][y0][1])
        }
    }
}
```

In this manner, using motion vector predictor information in order to code the motion vector delta may lead to better coding efficiency, compression, performance, and quality of video information.

The example method for motion vector difference coding for enhancement layer according to aspects of this disclosure will now be described in detail with respect to FIG. 4. The process 400 may be performed by an encoder (e.g., the encoder as shown in FIG. 2, etc.) or a decoder (e.g., the decoder as shown in FIG. 3, etc.). The blocks of the process 400 are described with respect to the encoder 20 in FIG. 2, but the process 400 may be performed by other components, such as a decoder, as mentioned above.

At block 401, the encoder 20 receives temporal reference information for the current pixel. The temporal reference information may indicate reference frames from different points in time from which the motion vectors for inter prediction may be obtained. The encoder 20 may obtain the temporal reference information, e.g., by decoding the syntax information. At block 402, the encoder 20 receives motion vector predictor information. The encoder 20 may obtain the motion vector predictor information, e.g., by decoding the syntax information. The motion vector predictor information may indicate the location of motion vectors within the temporal references, e.g., where the predictor motion vectors may be found within the reference frames. At block 403, the encoder 20 processes the motion vector delta of the current pixel in the difference domain based on the pixel accuracy of the predictor motion vector(s). Such processing may include coding the motion vector delta for the current pixel based on the predictor motion vector(s). The encoder 20 may give more weight to motion vectors that have a similar pixel type as the current pixel. The encoder 20 may adjust the process of coding the motion vector delta for the current unit appropriately based on the information included in the motion vector predictor information. Although the example method has been described in terms of pixels, the example method described with respect to FIG. 4 may be implemented at various syntax levels. In addition, all embodiments described with respect to FIG. 4 may be implemented separately, or in combination with one another.

Figure 4A:
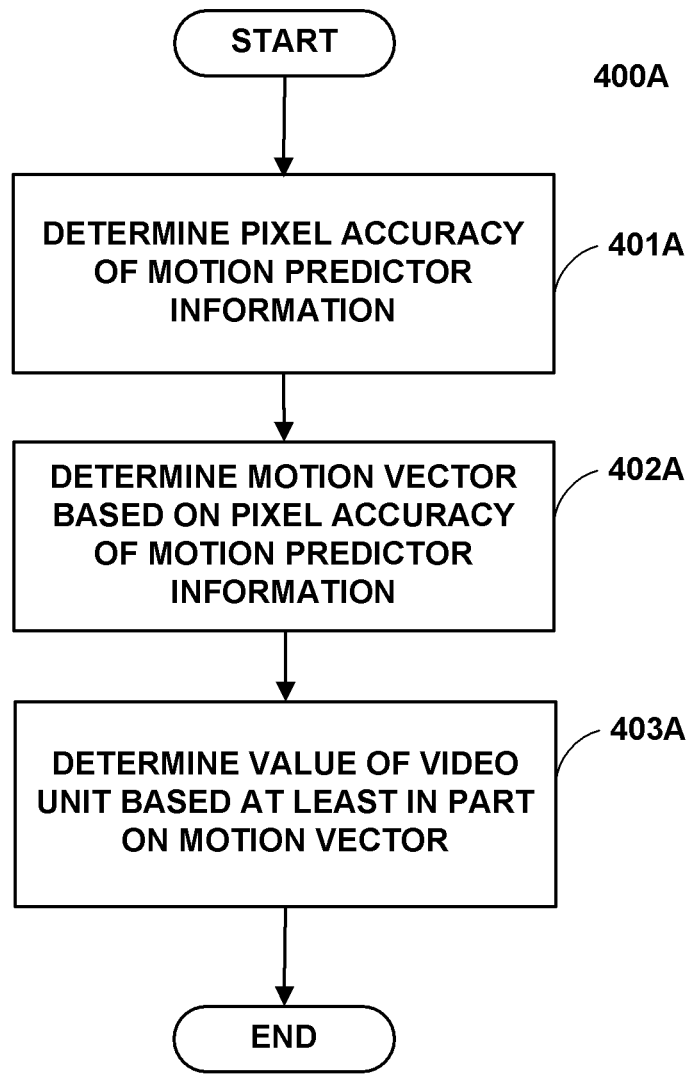
FIG. 4A is a flowchart illustrating another example method for motion vector difference coding for enhancement layer according to aspects of this disclosure.

FIG. 4A is a flowchart illustrating another example method for motion vector difference coding for enhancement layer according to aspects of this disclosure. The process 400A may be performed by an encoder (e.g., the encoder as shown in FIG. 2, etc.) or a decoder (e.g., the decoder as shown in FIG. 3, etc.). The blocks of the process 400A are described with respect to the encoder 20 in FIG. 2, but the process 400A may be performed by other components, such as a decoder, as mentioned above. The process 400A may be used to code a video unit in the difference domain. All embodiments described with respect to FIG. 4A may be implemented separately, or in combination with one another.

At block 401A, the encoder 20 determines the pixel accuracy of motion predictor information. Pixel accuracy may refer to accuracy of motion predictor information. For example, pixel accuracy may indicate the extent to which the motion predictor information is accurate, e.g., the motion predictor information may be accurate to a half-pixel level or a quarter-pixel level, or an even smaller sub-pixel level. Pixel accuracy may also be referred to as "pixel type." In some embodiments, the motion predictor information may be motion vector predictor information. Motion vector predictor information may be used in determining the motion vector for the current video unit. The motion vector predictor information may include information relating to the motion vectors that are to be used in predicting the value of the current video unit. For example, the motion vector predictor information may provide motion vector candidates for determining the motion vector for the current video unit.

At block 402A, the encoder 20 determines a motion vector based on the pixel accuracy of the motion predictor information. A motion vector may be used in inter prediction for a video unit. A motion vector may be used to generate a prediction unit for a video unit. The encoder 20 may determine the motion vector based on the pixel accuracy of the motion predictor information. For example, the encoder 20 can choose to use the motion predictor information in determining the motion vector for a current video unit if the pixel accuracy meets certain criteria. Such criteria may include whether the pixel accuracy is of a type that is likely to occur in the difference domain. In the difference domain, motion vectors may be more likely to have half pixel accuracy. Therefore, in some embodiments where the difference domain is used, the encoder 20 may choose to use the motion predictor information to determine the motion vector if the pixel accuracy of the motion predictor information is half pixel. The encoder 20 may choose to not use motion predictor information with pixel accuracy that does not meet the desired criteria. The encoder 20 may choose to weight the motion predictor information (e.g., apply a weighting factor) if the motion predictor information is not of desired accuracy. Such weighting may be based on the extent to which the accuracy of the motion predictor information matches the desired level of accuracy.

At block 403A, the encoder 20 determines a value of a video unit based at least in part on the motion vector. A video unit may be any unit of video data, and can include but is not limited to: a frame, a slice, a largest coding unit (LCU), a coding unit (CU), a block, a pixel, and a sub-pixel. The value of the video unit may be determined by generating a prediction unit (PU) for the video unit.

In some embodiments, the motion predictor information is the motion vector predictor information, and the encoder 20 determines the motion vector for the current video unit based on the motion vector predictor information, motion vector delta, and reference information associated with reference video units for the video unit. In one embodiment, the reference information associated with the reference video units is the reference index. The reference index refers to temporal references, which are references at different points in time, from which the motion vector predictor information for the current video unit can be obtained. Motion vector predictors can be obtained from the motion vector predictor information for the temporal references indicated by the reference index. The motion vector predictors may or may not be used in predicting the motion vector for the current video unit depending on the pixel accuracy of the motion vector predictors. The motion vector for the current video unit may be determined by adding the motion vector delta to the motion vector predictors.

In certain embodiments, the encoder 20 may also use the motion vector predictor information in order to determine the context for coding motion vector delta.

Figure 5:
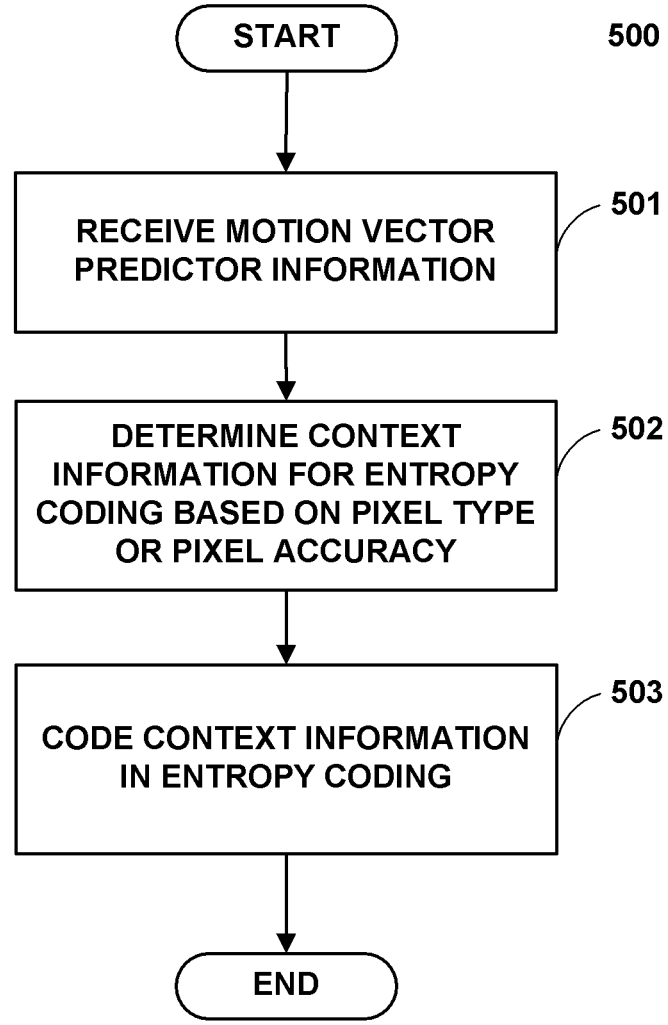
FIG. 5 is a flowchart illustrating an example method for context modeling in the enhancement layer coding according to aspects of this disclosure.

FIG. 5 is a flowchart illustrating an example method for context modeling in the enhancement layer coding according to aspects of this disclosure. The motion vector predictor information may be used to code additional context information used in entropy coding, e.g., context-adaptive binary arithmetic coding (CABAC). Context information may indicate the probability associated with a value being entropy coded. For example, the context information may indicate the probability of the entropy coded value being 1, or the probability of the entropy coded value being 0, etc. In the example method for context modeling the enhancement layer coding, the following contexts are proposed for coding the motion vector delta syntax:

"abs_mvd_greater0_flag_Ctx0" and "abs_mvd_greater0_flag_Ctx1" context for coding horizontal and vertical of "abs_mvd_greater0_flag"

"abs_mvd_greater1_flag_Ctx0" and "abs_mvd_greater1_flag_Ctx1" context for coding horizontal and vertical of "abs_mvd_greater1_flag"

In motion vector difference coding, the "abs_mvd_greater0_flag[compIdx]" flag specifies whether the absolute value of a motion vector component difference is greater than 0. The horizontal motion vector component difference is assigned compIdx=0, and the vertical motion vector component difference is assigned compIdx=1. Similarly, the "abs_mvd_greater1_flag[compIdx]" flag specifies whether the absolute value of a motion vector component difference is greater than 1. The horizontal motion vector component difference is assigned compIdx=0, and the vertical motion vector component difference is assigned compIdx=1.

For "abs_mvd_greater0_flag," the context selection between the contexts "abs_mvd_greater0_flag_Ctx0" and "abs_mvd_greater0_flag_Ctx1" may be performed as follows:

```
If (diff_coding_flag && (predictorMV & 0x1))
    abs_mvd_greater0_flag_Ctx0
Else
    abs_mvd_greater0_flag_Ctx1
```

For example, in the difference domain, if the predictor motion vector is 0, the context is coded as "abs_mvd_greater0_flag_Ctx0." If the predictor motion vector is 1, the context is coded as "abs_mvd_greater0_flag_Ctx1." The expression (predictorMV & 0x1) determines whether the predictor is half-pixel accuracy or quarter-pixel accuracy. If PredictorMV is odd, it indicates that the predictor is quarter pixel accuracy, and if PredictorMV is even, it indicates that the predictor is half pixel accuracy. For "abs_mvd_greater1_flag," the context selection between the contexts "abs_mvd_greater1_flag_Ctx0" and "abs_mvd_greater0_flag_Ctx1" may be performed as follows:

```
If (diff_coding_flag && (predictorMV & 0x1))
    abs_mvd_greater1_flag_Ctx0
Else
    abs_mvd_greater1_flag_Ctx1
```

For example, in the difference domain, if the predictor motion vector is 0, the context is coded as "abs_mvd_greater1_flag_Ctx0." If the predictor motion vector is 1, the context is coded as "abs_mvd_greater1_flag_Ctx1." In this manner, additional context information may be provided based on the motion vector predictor information. Additional context information may lead to better compression, better performance, and quality improvement of video information.

The example method for context modeling for enhancement layer coding according to aspects of this disclosure will now be described in detail with reference to FIG. 5. The process 500 may be performed by an encoder (e.g., the encoder as shown in FIG. 2, etc.) or a decoder (e.g., the decoder as shown in FIG. 3, etc.). The block of the process 500 are described with respect to the encoder 20 in FIG. 2, but the process 500 may be performed by other components, such as a decoder, as mentioned above.

At block 501, the encoder 20 receives motion vector predictor information. For example, the motion vector predictor information may be decoded from the syntax information. The encoder 20 may determine the pixel type of the motion vectors included in the motion vector predictor information. For example, the motion vectors in the motion vector predictor information may be half pixels or quarter pixels or even smaller. At block 502, the encoder 20 determines the context information for entropy coding based on the pixel type of the predictor motion vectors. As explained above, additional context information may be provided in entropy coding based on the type of motion vector. At block 503, the encoder 20 codes the context information determined at block 502 in entropy coding. Although the example method has been described in terms of pixels, the example method described with respect to FIG. 5 may be implemented at various syntax levels. In addition, all embodiments described with respect to FIG. 5 may be implemented separately, or in combination with one another.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video information, the apparatus comprising:
   a memory unit configured to store difference video information associated with a difference video layer of pixel information derived from a difference between an enhancement layer and a corresponding base layer of the video information; and
   a processor in communication with the memory unit, the processor configured to:
      determine pixel accuracy of a motion vector predictor of a video unit;
      determine whether a reference video unit including the motion vector predictor is associated with the difference video layer;
      code a motion vector delta of the video unit based on the determined accuracy of the motion vector predictor and the determination of whether the reference video unit is associated with the difference video layer;
      determine a context for coding the motion vector delta based on the determined accuracy of the motion vector predictor and the determination of whether the reference video unit is associated with the difference video layer;
      determine the motion vector for the video unit based on the coded motion vector delta, wherein the motion vector is generated by adding the motion vector delta and the motion vector predictor; and
      generate a prediction unit for the video unit using the motion vector.

2. The apparatus of claim 1, wherein the processor is further configured to perform inter prediction to generate the prediction unit using the motion vector.

3. The apparatus of claim 1, wherein the reference video unit is identified by a reference index.

4. The apparatus of claim 1, wherein the processor is further configured to obtain the motion vector predictor prior to the motion vector delta.

5. The apparatus of claim 1, wherein the processor is further configured to determine a first context of a plurality of contexts as the context for coding the motion vector delta when the pixel accuracy of the motion vector predictor is a type that is associated with the difference video layer.

6. The apparatus of claim 5, wherein the pixel accuracy is half pixel.

7. The apparatus of claim 1, wherein the processor is further configured to adjust a sum of the motion vector delta and the motion vector predictor based upon the pixel accuracy.

8. The apparatus of claim 7, wherein the processor is further configured to apply a weighting factor to the sum of the motion vector delta and the motion vector predictor based upon the pixel accuracy.

9. The apparatus of claim 7, wherein the processor is further configured to increase the sum when the pixel accuracy is a type that is associated with the difference video layer.

10. The apparatus of claim 9, wherein the processor is further configured to increase the sum when the pixel accuracy is half pixel.

11. The apparatus of claim 7, wherein the processor is further configured to decrease the sum when the pixel accuracy is a type that is not associated with the difference video layer.

12. The apparatus of claim 11, wherein the processor is further configured to decrease the sum when the pixel accuracy is a quarter pixel or smaller.

13. The apparatus of claim 1, wherein the video unit is selected from a group comprising: frame, slice, largest coding unit (LCU), coding unit (CU), block, pixel, or sub-pixel.

14. The apparatus of claim 1, wherein the processor is further configured to reconstruct the video unit based on the prediction unit for the video unit.

15. The apparatus of claim 1, wherein the base layer is a reconstructed base layer.

16. The apparatus of claim 1, wherein the processor is further configured encode the video unit and to signal the motion vector predictor in a bitstream.

17. The apparatus of claim 1, wherein the processor is further configured decode the video unit and to receive the motion vector predictor in a bitstream.

18. The apparatus of claim 1, wherein the apparatus comprises one or more of: a desktop computer, a notebook computer, a laptop computer, a tablet computer, a set-top box, a telephone handset, a smart phone, a wireless communication device, a smart pad, a television, a camera, a display device, a digital media player, a video gaming console, or a video streaming device.

19. A method of coding video information comprising:
   storing difference video information associated with a difference video layer of pixel information derived from a difference between an enhancement layer and a corresponding base layer of the video information;
   determining pixel accuracy of a motion vector predictor of a video unit;
   determining whether a reference video unit including the motion vector predictor is associated with the difference video layer;
   coding a motion vector delta of the video unit based on the determined accuracy of the motion vector predictor and the determination of whether the reference video unit is associated with the difference video layer;
   determining a context for coding the motion vector delta based on the determined accuracy of the motion vector predictor and the determination of whether the reference video unit is associated with the difference video layer;
   determining the motion vector for the video unit based on the coded motion vector delta, wherein the motion vector is generated by adding the motion vector delta and the motion vector predictor; and
   generating a prediction unit for the video unit using the motion vector.

20. The method of claim 19, wherein the prediction unit is generated by performing inter prediction using the motion vector.

21. The method of claim 19, wherein the reference video unit is identified a reference index.

22. The method of claim 19, wherein the motion vector predictor is obtained prior to the motion vector delta.

23. The method of claim 19, further comprising determining a first context of a plurality of contexts as the context for coding the motion vector delta when the pixel accuracy of the motion vector predictor is a type that is associated with the difference video layer.

24. The method of claim 23, wherein the pixel accuracy is half pixel.

25. The method of claim 19, further comprising determining the motion vector by adjusting a sum of the motion vector delta and the motion vector predictor based upon the pixel accuracy.

26. The method of claim 25, wherein said adjusting comprises applying a weighting factor to the sum of the motion vector delta and the motion vector predictor based upon the pixel accuracy.

27. The method of claim 25, wherein said adjusting comprises increasing the sum when the pixel accuracy is a type that is associated with the difference video layer.

28. The method of claim 27, wherein said adjusting comprises increasing the sum when the pixel accuracy is half pixel.

29. The method of claim 25, wherein said adjusting comprises decreasing the sum when the pixel accuracy is a type that is not associated with the difference video layer.

30. The method of claim 29, wherein said adjusting comprises decreasing the sum when the pixel accuracy is a quarter pixel or smaller.

31. The method of claim 19, wherein the video unit is selected from a group comprising: frame, slice, largest coding unit (LCU), coding unit (CU), block, pixel, or sub-pixel.

32. The method of claim 19, further comprising reconstructing the video unit based on the prediction unit for the video unit.

33. The method of claim 19, wherein the base layer is a reconstructed base layer.

34. The method of claim 19, further comprising encoding the video unit and signaling the motion vector predictor in a bitstream.

35. The method of claim 19, further comprising decoding the video unit and receiving the motion vector predictor in a bitstream.

36. A non-transitory computer-readable storage medium having instructions stored thereon that when executed cause an apparatus to:
store a difference video layer of pixel information derived from a difference between an enhancement layer and a corresponding reconstructed base layer of the video information;
determine pixel accuracy a motion vector predictor of a video unit;
determine whether a reference video unit including the motion vector predictor is associated with the difference video layer;
code a motion vector delta of the video unit based on the determined accuracy of the motion vector predictor and the determination of whether the reference video unit is associated with the difference video layer;
determine a context for coding the motion vector delta based on the determined accuracy of the motion vector predictor and the determination of whether the reference video unit is associated with the difference video layer;
determine the motion vector for the video unit based on the coded motion vector delta, wherein the motion vector is generated by adding the motion vector delta and the motion vector predictor; and
generate a prediction unit for the video unit using the motion vector.

37. The computer-readable storage medium of claim 36, further comprising instructions to perform inter prediction using the motion vector to generate the prediction unit.

38. The computer-readable storage medium of claim 36, further comprising instructions to determine a first context of a plurality of contexts as the context for coding the motion vector delta when the pixel accuracy of the motion vector predictor is a type that is associated with the difference video layer.

39. The computer-readable storage medium of claim 36, further comprising instructions to adjust a sum of the motion vector delta and the motion vector predictor based upon the pixel accuracy.

40. An apparatus for coding video information comprising:
means for determining pixel accuracy of a motion vector predictor of a video unit;
means for determining whether a reference video unit including the motion vector predictor is associated with a difference video layer, the difference video layer derived from a difference between an enhancement layer and a corresponding reconstructed base layer of the video information;
means for coding a motion vector delta of the video unit based on the determined accuracy of the motion vector predictor and the determination of whether the reference video unit is associated with the difference video layer;
means for determining a context for coding the motion vector delta based on the determined accuracy of the motion vector predictor and the determination of whether the reference video unit is associated with the difference video layer;
means for determining the motion vector for the video unit based on the coded motion vector delta, wherein the motion vector is generated by adding the motion vector delta and the motion vector predictor and; and
means for generating a prediction unit for the video unit using the motion vector.

41. The apparatus of claim 40, wherein the means for generating the prediction unit performs inter prediction using the motion vector to generate the prediction unit.

42. The apparatus of claim 40, wherein the means for determining the context for coding the motion vector delta determines a first context of a plurality of contexts as the context for coding the motion vector delta when the pixel accuracy of the motion vector predictor is a type that is associated with the difference video layer.

43. The apparatus of claim 40, wherein the means for determining the motion vector adjusts a sum of the motion vector delta and the motion vector predictor based upon the pixel accuracy.

* * * * *